United States Patent
Soliman

(10) Patent No.: US 7,072,612 B2
(45) Date of Patent: Jul. 4, 2006

(54) REPEATER IDENTIFICATION IN POSITION DETERMINATION SYSTEM

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 613 days.

(21) Appl. No.: 10/434,671

(22) Filed: May 9, 2003

(65) Prior Publication Data

US 2004/0176029 A1    Sep. 9, 2004

Related U.S. Application Data

(60) Provisional application No. 60/452,214, filed on Mar. 3, 2003.

(51) Int. Cl.
*H04B 7/185* (2006.01)
(52) U.S. Cl. .................. 455/13.1; 455/427; 455/11.1; 455/18
(58) Field of Classification Search ............... 455/13.1, 455/427, 11.1, 16, 18, 12.1, 67.16; 340/573; 342/453, 357
See application file for complete search history.

(56) References Cited

U.S. PATENT DOCUMENTS

| 4,215,345 A | * | 7/1980 | Frosch et al. ............... 342/465 |
| 5,552,772 A | * | 9/1996 | Janky et al. ............. 340/573.4 |
| 5,936,572 A | * | 8/1999 | Loomis et al. .............. 342/457 |
| 6,681,099 B1 | * | 1/2004 | Keranen et al. ......... 455/67.16 |
| 6,795,019 B1 | * | 9/2004 | Holt ........................... 342/453 |

FOREIGN PATENT DOCUMENTS

| GB | 2353648 | 2/2001 |
| WO | 03001699 | 1/2003 |

* cited by examiner

*Primary Examiner*—Quochien B. Vuong
*Assistant Examiner*—Tan Trinh
(74) *Attorney, Agent, or Firm*—Philip Wadsworth; Bruce W. Greenhaus; Andrea L. Mays

(57) ABSTRACT

A method of identifying whether a first signal received at a subscriber station has been relayed by a repeater. The method involves measuring at the subscriber station a time difference of arrival between the first signal and a second signal. A hyperboloid or other potential solution surface is then formed from the measured time difference of arrival. A determination is then made whether or not the first signal was relayed by a repeater based on information derived from the potential solution surface.

25 Claims, 14 Drawing Sheets

$$\begin{Bmatrix} x[u,v] \\ y[u,v] \\ z[u,v] \end{Bmatrix} = \begin{Bmatrix} a\,\text{Cosh}[u]\,\text{Cosh}[v] \\ b\,\text{Cosh}[v]\,\text{Sinh}[u] \\ c\,\text{Sinh}[v] \end{Bmatrix}$$

FIGURE 5B

$$\frac{x^2}{a^2} - \frac{y^2}{b^2} - \frac{z^2}{c^2} = 1$$

FIGURE 5C

REPEATER IDENTIFICATION IN POSITION DETERMINATION SYSTEM

RELATED APPLICATIONS

This application claims priority to U.S. Provisional Application No. 60/452,214, filed on Mar. 3, 2003.

FIELD OF THE INVENTION

This invention relates to the fields of position determination and wireless communications, and, more specifically, to position determination in a wireless communications system which employs repeaters.

RELATED ART

Repeaters are a flexible and cost effective way to extend coverage or fill coverage gaps in wireless communications systems. They may also be used to render a particular pilot dominant within a coverage area of a CDMA system which is subject to many pilots. Examples of areas where repeaters typically prove useful for adding or extending coverage are terrain variations such as valleys, tunnels and office buildings. For a small fraction of the cost of full base stations, repeaters are appropriate for use in new as well as well-established and mature networks.

There are several implementations of repeaters. In the most common implementation, the repeater acts as a bi-directional amplifier as shown in FIG. 1. On the forward (down) link, the repeater 104 receives a transmission from donor cell base station (BTS) 102, amplifies it and sends it to the subscriber station (SS) 106. The BTS 102 may be an omni station or a sector in a multi-sector cell. On the reverse link, the SS 106 sends a transmission to the repeater 104, which amplifies it and sends it to the BTS 102. As can be seen, the repeater relays a reliable signal between the donor cell and the subscriber station in an area that may not have reliable coverage otherwise.

Pursuant to an FCC mandate, efforts are underway to equip subscriber stations with the capability of determining their locations from transmissions received from various sources, such as GPS satellites, base stations, or combinations of GPS satellites and base stations. The subscriber station receives transmissions from four or more sources whose precise positions are known. These sources are synchronized to single time reference. The subscriber station then derives a time measurement from each of the transmissions, which represents the time of flight along a line-of-sight path between the source and the subscriber station. The subscriber station then provides these time measurements to a position determination entity (PDE). In response, the PDE estimates the location of the subscriber station from (a) these time measurements, (b) the known speed of light, and (c) the known locations of the sources. Alternatively, the subscriber station uses this information to determine its own position.

The presence of repeaters in a wireless communications system can render the position determination process ambiguous. For example, due to the presence of repeaters, there is a danger that a subscriber station will erroneously assume a transmission originating from a base station but relayed by a repeater is a line-of-sight transmission from the base station. Since a time measurement derived from this transmission will overstate the time of flight between the base station and the subscriber station, an estimate of the location of the subscriber station which is based on this time measurement will be erroneous.

This problem may be further explained with reference to FIG. 2. As shown, subscriber station 212 receives transmissions from four sources, comprising GPS satellite 202, BTS 204, GPS satellite 206, and BTS 208. Each of the transmissions from sources 202, 204, and 206 is a line-of-sight transmission. However, there are two transmissions received from BTS 208. The first, identified with numeral 214, is received directly from BTS 208. The second, identified with numeral 216, is relayed by repeater 210. Both transmissions from BTS 208 are modulated with the same PN code uniquely identifying BTS 208. The transmission 216 relayed by the repeater 210 is stronger than transmission 214, and hence is chosen by the subscriber station 212 for use in the position determination process in lieu of the transmission 214.

The subscriber station 212, upon receiving the transmissions, erroneously identifies the transmission 216 relayed by repeater 210 as a line of sight transmission from BTS 208. Therefore, it also erroneously identifies the time measurement derived from this transmission as being representative of the time of flight between the BTS 208 and the subscriber station 212. However, this time measurement is not representative of this time of flight, but in fact overstates it. Consequently, a position estimate based on this time measurement will be erroneous.

SUMMARY

A method is described of identifying whether a first signal received at a subscriber station has been relayed by a repeater. In one embodiment, the method is performed by or within a subscriber station operating within a synchronous position determination system. The method begins by measuring at the subscriber station a time difference of arrival between the first signal and a second signal. In one embodiment, the first signal originates from a base station, and the second signal is a signal known to have been directly received from its source, and not relayed by a repeater. In one implementation, the second signal originates from a GPS satellite.

Next, a potential solution surface indicating possible positions of the subscriber station is formed from the measured time difference of arrival. In one embodiment, the potential solution surface is a hyperboloid. In one implementation, the hyperboloid is a two-sheet hyperboloid having two loci located respectively at the locations of the originating base station for the first signal and the originating source of the second signal. For any point P on the two-sheet hyperboloid, the sum of the distances between the point P and the two loci is a constant, equal to the measured time difference of arrival between the first and second signals.

A determination is made whether or not the first signal was relayed by a repeater based on information derived from the potential solution surface. In one embodiment, a plane approximately tangential to the surface of the earth at the location of the originating base station for the first signal is formed, and intersected with the potential solution surface to form an intersection curve. If the intersection curve intersects or lies within the coverage area of the originating base station for the first signal, the first signal is identified as having been directly received from its originating base station. If the intersection curve does not intersect and lies outside the coverage area of the originating base station for the first signal, the first signal is identified as having been relayed by a repeater.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 5B illustrates a parametric mathematical expression for a two-sheet hyperboloid.

FIG. 5C illustrates a non-parametric mathematical expression for a two-sheet hyperboloid.

DETAILED DESCRIPTION

As utilized herein, terms such as "about", "approximately", "substantially" and "near" are intended to allow some leeway in mathematical exactness to account for tolerances that are acceptable in the trade. Accordingly, any deviations upward or downward from the value modified by the terms "about", "approximately", "substantially" or "near" in the range of 1% to 20% or less should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general-or special-purpose microprocessor, finite state machine, controller, computer, digital signal processor (DSP), or the like.

The term "logic" refers to implementations of functionality in hardware, software, or any combination of hardware and software.

The phrase "base station" (BTS) includes individual sectors.

The phrase "GPS satellite" includes space vehicles (SVs).

The phrase "position determination system" includes position determination systems overlaid onto or integrated within wireless communications systems.

A "synchronous" position determination system is one having a system time reference common to all or substantially all or many of the elements of the system.

The phrase "time difference of arrival" of a first signal in relation to a second signal is the absolute value of the difference between the times of arrival of the first and second signals.

EXAMPLE ENVIRONMENT

Figure 1:
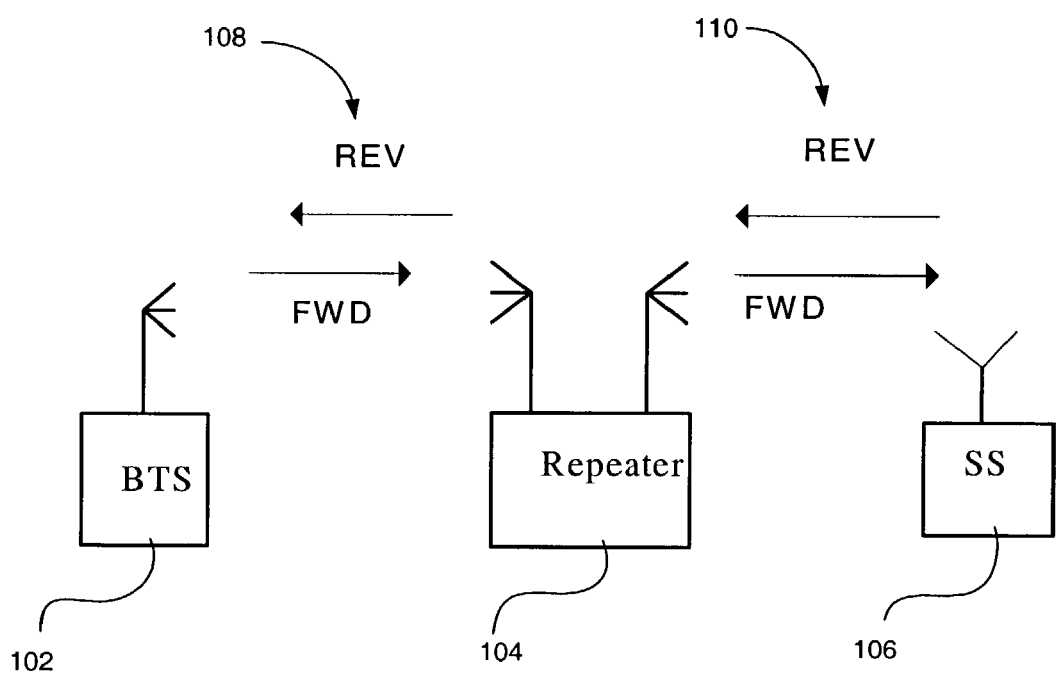
FIG. 1 is a block diagram illustrating a typical application of a repeater as a bi-directional amplifier between a base station and a subscriber station.
Figure 2:
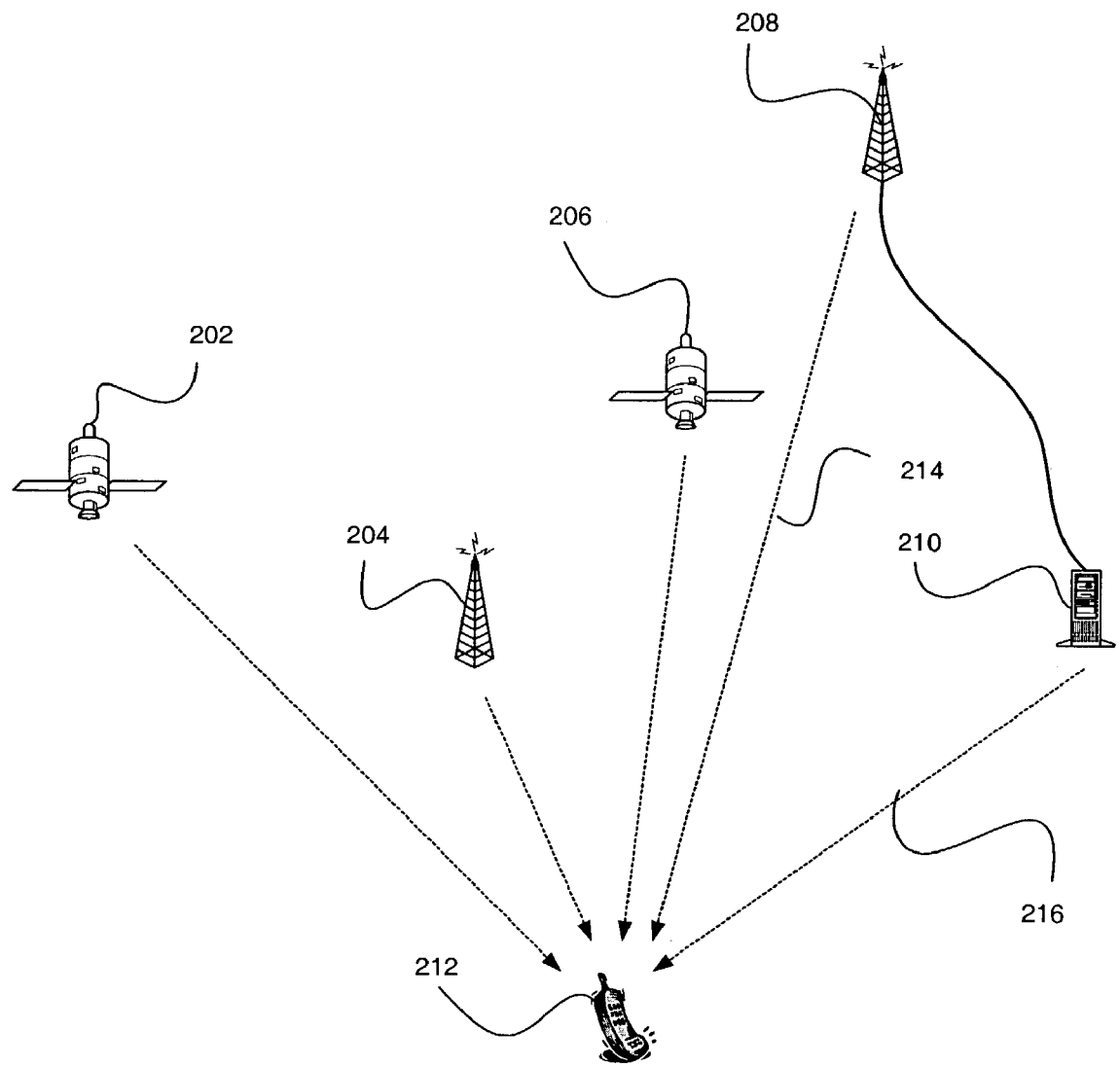
FIG. 2 is a diagram illustrating the ambiguity introduced by a repeater in a position determination system.
Figure 3:
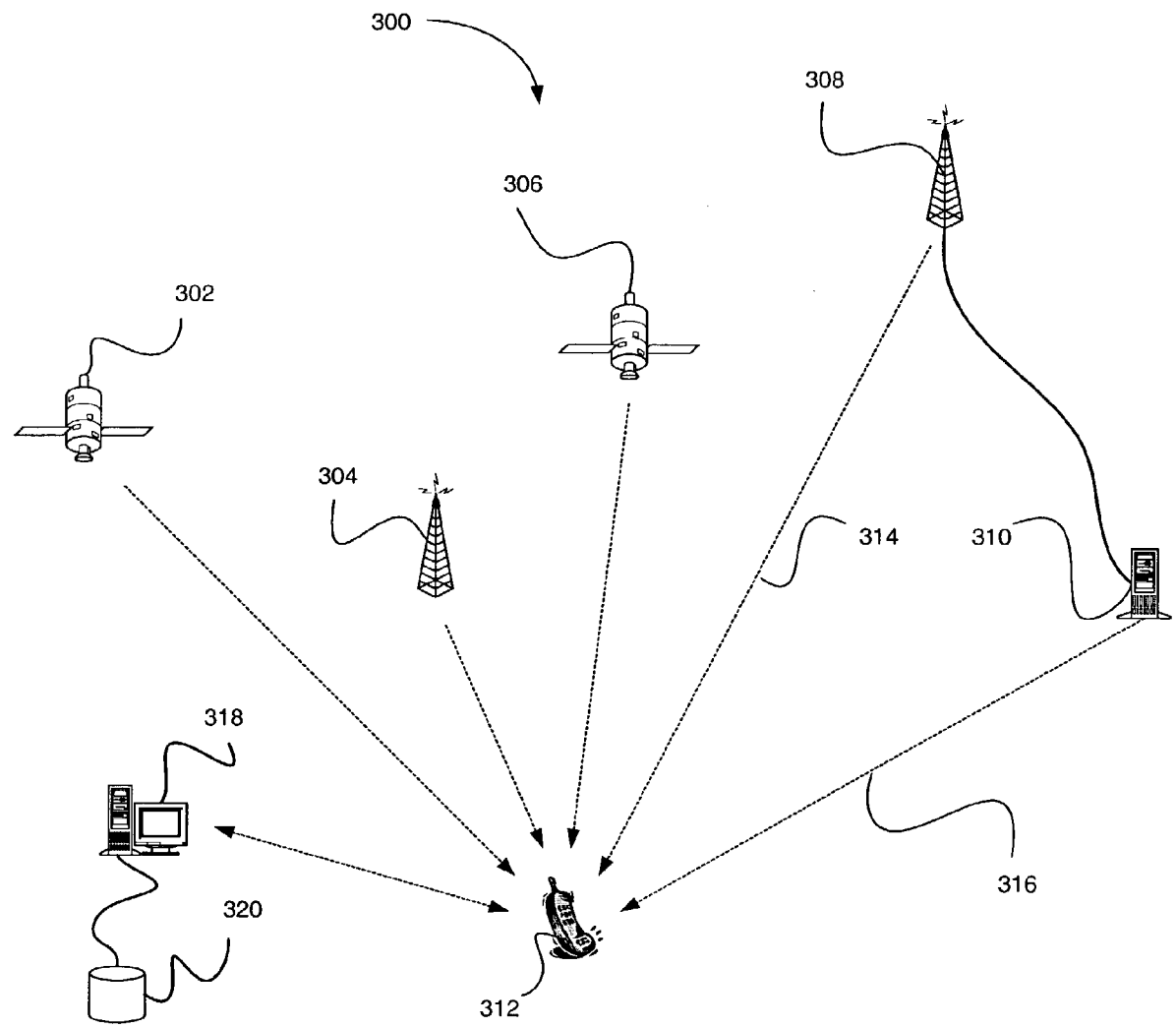
FIG. 3 is a diagram illustrating a position determination entity in a position determination system for computing the location of a subscriber station, and correcting time measurements derived from signals determined to have been relayed by a repeater.

The system 300 of FIG. 3 determines the position of a subscriber station 312 in a wireless communication system that may employ repeaters. This system is one example of an environment in which methods according to the invention may operate, and it should be appreciated that other environments are possible. Hence, nothing in the description of this example environment should be taken as limiting.

In this system, subscriber station 312 receives signals transmitted by a plurality of sources 302, 304, 306, and 308, visible to a receiver in the subscriber station. In addition, the signal from source 308 is both received directly and after transmission through a repeater 310. As illustrated, the sources may be BTSs, GPS satellites, or combinations of BTSs and GPS satellites. In the example illustrated, sources 302 and 306 are GPS satellites, and sources 304 and 308 are BTSs. Moreover, BTS 308 is a donor base station in relation to repeater 310.

Each of the sources transmits a signal which is modulated with an identification code which uniquely identifies the source. In one implementation, the identification codes are PN codes, which may differ in length or periodicity according to the source involved. For IS-95 compliant CDMA systems, the PN code is a sequence of length 32,768 chips which is repeated every 26.67 msec. In current GPS systems, the PN code is a sequence of length 1,023 chips which is repeated every one millisecond.

The signals transmitted by sources 302, 304, and 306, and the signal 314 transmitted by BTS 308, are all received directly by the subscriber station 312. Thus, all are line of sight signals in relation to the respective source. However, the signal 316 originating from base station 308 and relayed by repeater 310 is not a line of sight signal from the standpoint of the donor cell 308.

A database 320 is accessible to position determination entity (PDE) 318. The database 320 contains entries for each of the repeaters which are present in the wireless communications system. Each of the entries comprises a record of one or more calibration parameters, e.g., a position of and a time correction for the corresponding repeater. This information is derived using any of the methods for calibrating a repeater which are described in Qualcomm Dkt. No. 020407, U.S. patent application Ser. No. 10/366,960, filed Feb. 14, 2003, which is incorporated herein by reference. Each entry is indexed using the PN code of the donor cell. The database may also incorporate one or more almanacs indicating the current positions of each of the sources in the system 300, whether it be base stations, GPS satellites, or combinations of base stations and GPS satellites. In the system 300 illustrated in FIG. 3, these one or more almanacs indicate the current positions of GPS satellites 302 and 306, and base stations 304 and 308.

The subscriber station 312 is equipped with a correlator which is configured to derive a time of arrival measurement for each of the pilot signals received from the sources, both directly and through repeaters. Alternatively, a processor within the subscriber 312 is configured to determine the time of arrival measurements from correlation functions provided to it by the correlator. These pilot signals are typically received by the subscriber station 312 in the form of one or more composite signals.

The system 300 is assumed to be a synchronous system, a system that provides a time reference, such as (but not limited to) GPS time, common to all or at least many of the elements of the system. The subscriber station 312 uses this information to adjust the time of arrival measurements so they are in terms of system time. Alternatively, this task is performed by the PDE 318. Examples of synchronous wireless communications systems are IS-95 (CDMA), CDMA 2000, and WCDMA (synchronous mode) systems.

The subscriber station 312 also uses the method of the invention to identify whether any of the time of arrival measurement relate to signals relayed by repeaters. The subscriber station 312 then communicates to PDE 318 the time of arrival measurements and indicators of which of these measurements were relayed by repeaters.

If a time measurement is present which was derived from a signal relayed by a repeater, the PDE 318 uses the PN code for the donor cell to retrieve the calibration parameters for the repeater from the database 320. In particular, the PDE 318 retrieves a record containing the time correction for and position of the repeater. It then uses the time correction for the repeater to correct the time of arrival measurement derived from the pilot. It also substitutes the position of the repeater for that of the donor cell. It performs these adjustments for each of the time of arrival measurements determined to involve signals relayed by a repeater.

It then determines the position of the subscriber station 312 using the corrected time measurements and updated positions. Again, in one implementation, known triangulation or trilateration procedures are used to derive the position of subscriber station 312. Once determined, the position of the subscriber station 312 may be communicated by the PDE 318 to the subscriber station 312 or some other network entity.

Alternatively, the subscriber station 312 determines its own position using the database 320 of calibration parameters and one or more almanacs indicating the positions of the signal sources, which database and one or more almanacs are made accessible to the subscriber station 312.

EMBODIMENTS OF THE INVENTION

Figure 4:
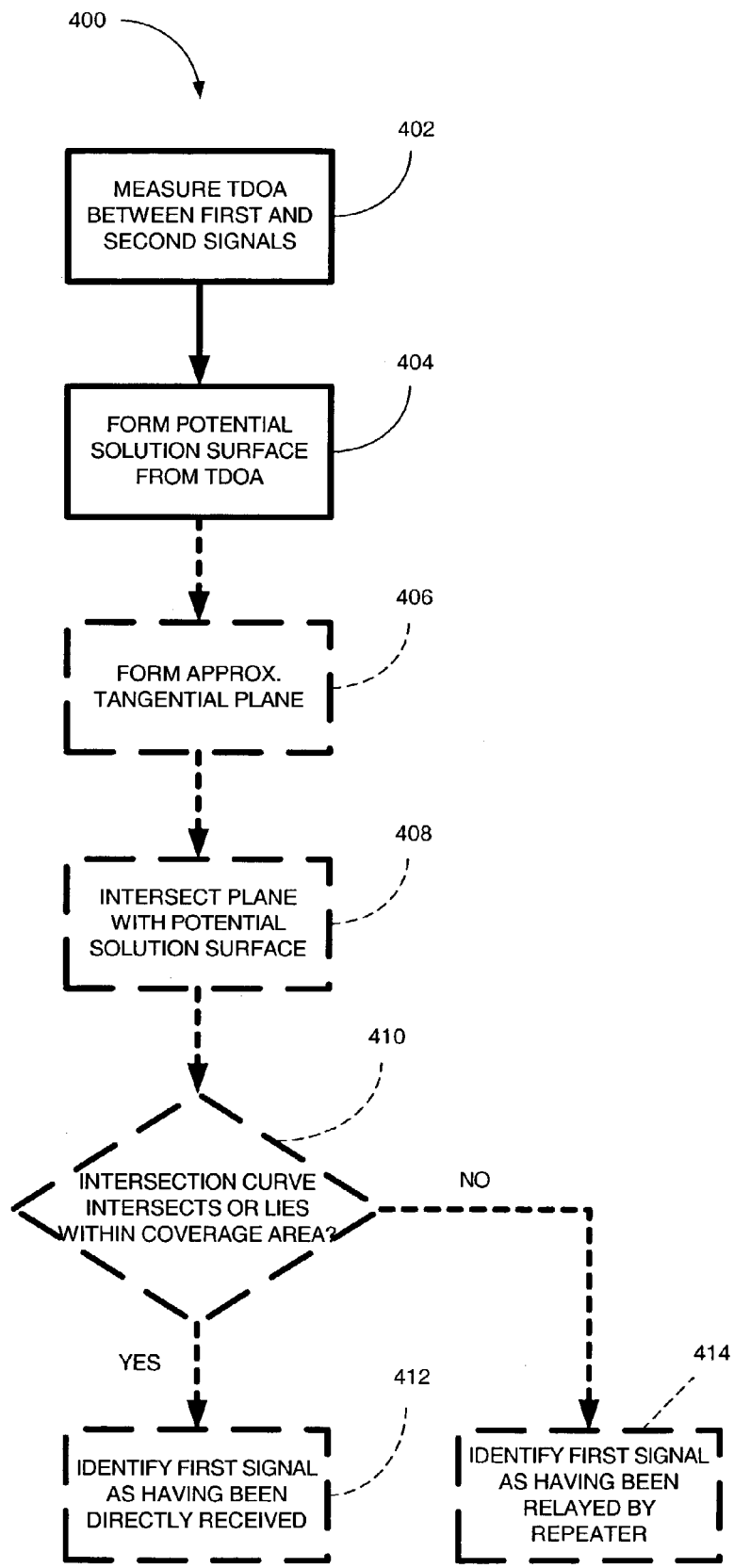
FIG. 4 is a flowchart of an embodiment according to the invention for identifying whether a first signal received by a subscriber station was relayed by a repeater.

A flowchart of an embodiment of a method according to the invention is illustrated in FIG. 4. This flowchart begins with step 402, which comprises measuring at the subscriber station a time difference of arrival between the first signal and a second signal. In one embodiment, the first signal is assumed to have originated from a base station having a known location and coverage area, and the second signal is assumed to have originated from a source having a known location. In addition, in one embodiment, the second signal is a signal which is known to have been directly received from its source and not relayed by a repeater. In one configuration, the second signal is a non-repeating signal. In one implementation, the method is performed by a subscriber station operating in a position determination system. In one implementation example, the position determination system is a synchronous position determination system.

In one embodiment, the locations of the originating base station for the first signal and the source of the second signal are known values. In one implementation, both these values are obtained from an almanac in which the current locations of all or at least many of the sources in the position determination system are maintained. In one implementation, the first and second signals are both pilot signals.

From step 402, the flowchart proceeds to step 404, forming a potential solution surface indicating possible positions of the subscriber station from the measured time difference of arrival.

Figure 5A:
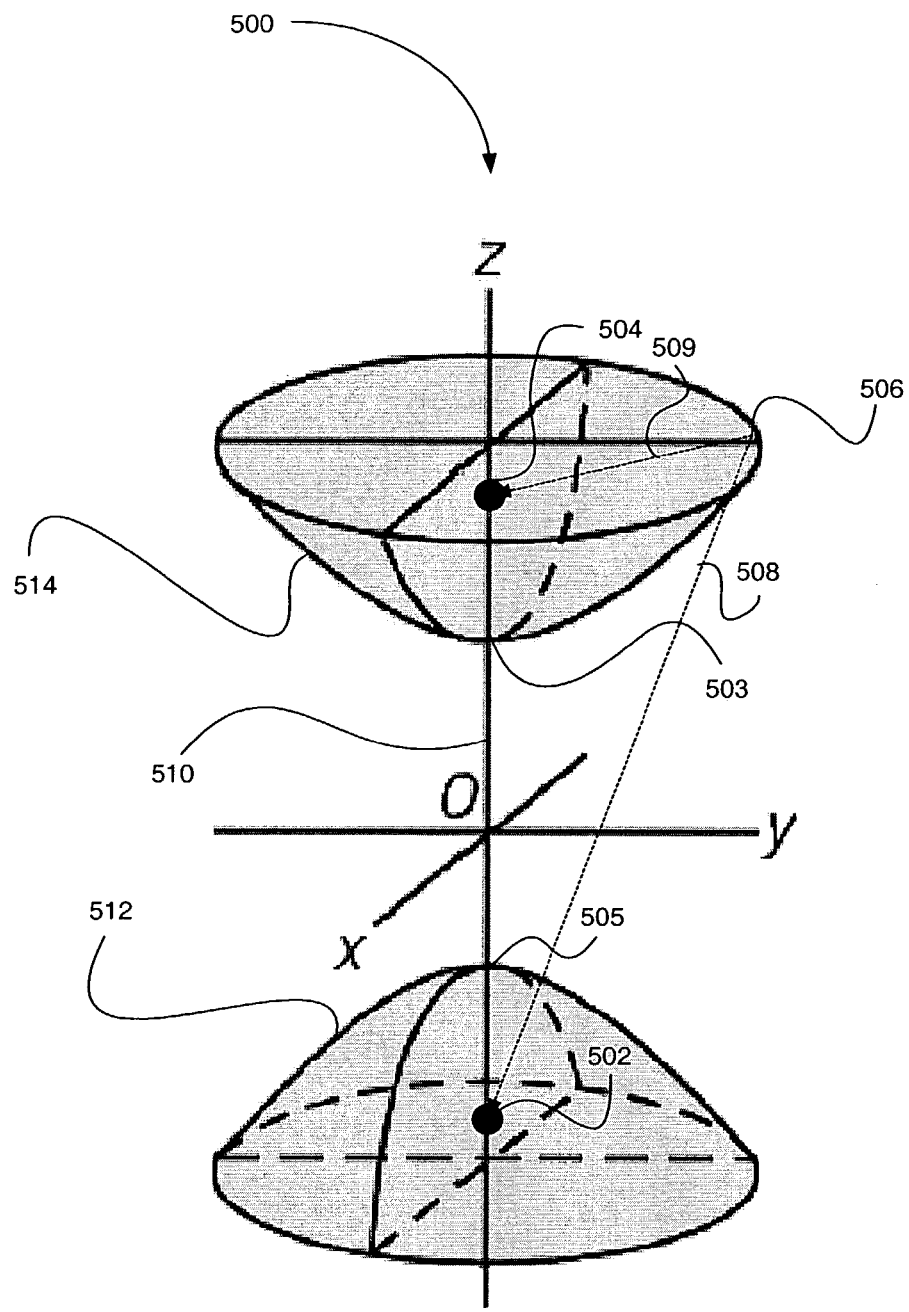
FIG. 5A is a diagram illustrating a two-sheet hyperboloid.

In one embodiment, the potential solution surface is a hyperboloid derived from the time difference of arrival value for the first signal in relation to the second signal, and the known locations of the first and second signals. In one implementation, illustrated in FIG. 5A, the hyperboloid is a two-sheet hyperboloid 500 having first and second sheets 512, 514, with loci 502, 504 located respectively at the known locations of the originating base station for the first signal, and the source of the second signal.

A characteristic of this two-sheet hyperboloid is that, for any point P on the hyperboloid, the difference of the distances to the first and second loci, identified respectively with numerals 508 and 509, is constant (or substantially constant) and equal (or substantially equal) to the time difference of arrival between the first and second signals measured in step 402. The axis of rotation is identified with numeral 510, and the vertices 503, 505 are the points of intersection between the axis of rotation 510 and the first and second sheets 512, 514. FIG. 5B illustrates a parametric expression for a two-sheet hyperboloid, and FIG. 5C illustrates a non-parametric expression for a two-sheet hyperboloid.

It is then determined whether or not the first signal was relayed by a repeater based on information derived from the potential solution surface. In one embodiment, this determination comprises steps 406, 408, 410, 412 and 414 illustrated in phantom in FIG. 4. In this embodiment, step 406 follows step 404. Step 406 comprises forming a plane approximately tangential to the surface of the earth at the location of the originating base station for the first signal. In one implementation, this plane is formed using known techniques from a normal vector extending from the center of the earth through a point on the surface of the earth at the location of the originating base station, and the point itself. Step 408 is then performed. Step 408 comprises intersecting the plane resulting from step 406 with the potential solution surface resulting from step 404 to form an intersection curve.

Figure 6:
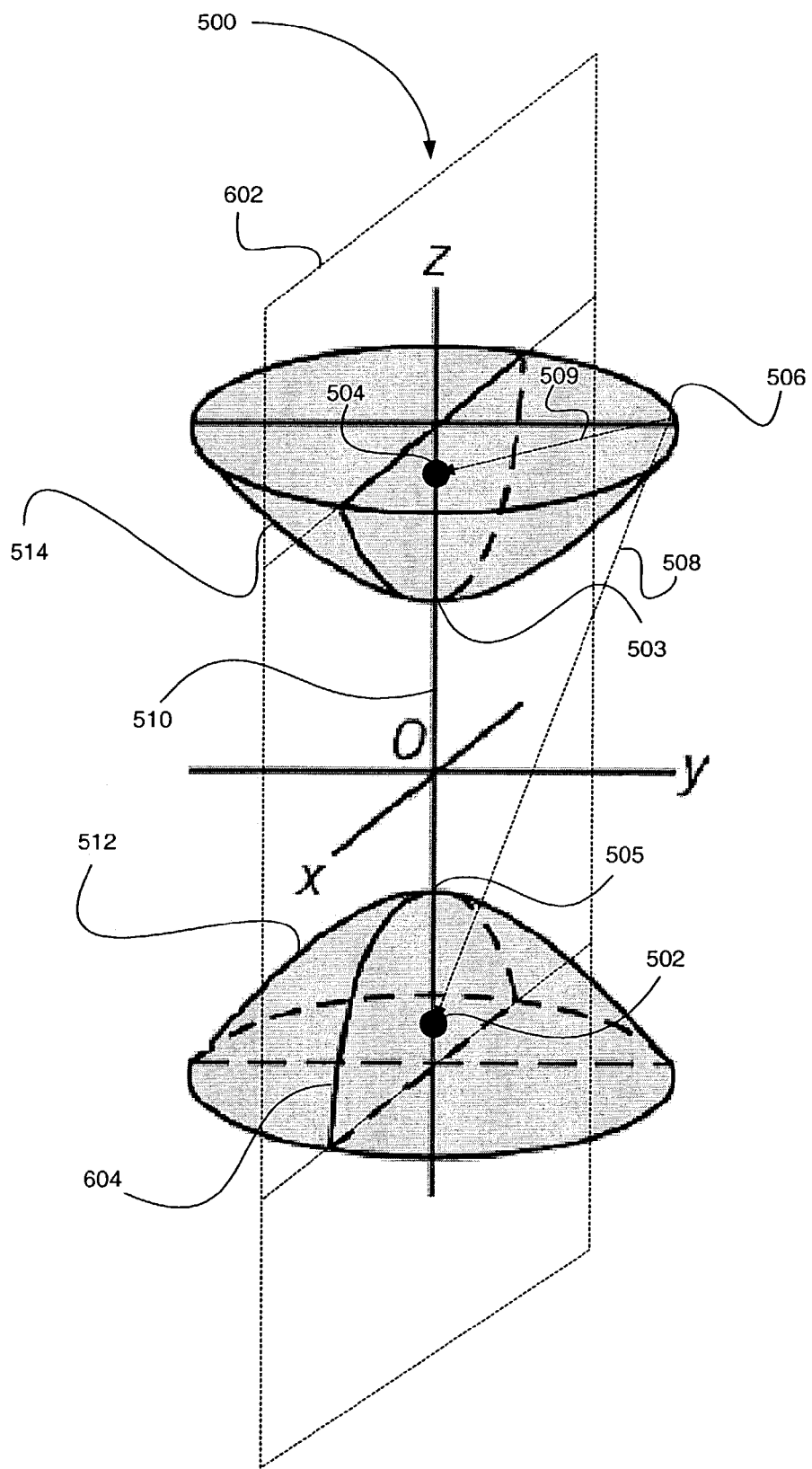
FIG. 6 is a diagram illustrating an intersection curve formed by intersecting a plane approximately tangential to the earth's surface at the location of the originating base station for a signal and the two-sheet hyperboloid of FIG. 5.

FIG. 6 illustrates an example of this step for the case in which the potential solution surface resulting from step 404 is the two-sheet hyperboloid 500 of FIG. 5. Plane 602 is the plane approximately tangential to the surface 600 of the earth at the location 502 of the originating base station for the first signal. Curve 604 is the intersection curve formed by intersecting the plane 602 with two-sheet hyperboloid 500.

Turning back to FIG. 4, inquiry step 410 follows step 408. Step 410 comprises determining whether the intersection curve resulting from step 408 intersects or lies within the coverage area of the originating base station for the first signal. If so, step 412 is performed. In step 412, the first signal is identified as having been directly received from its originating base station.

If, in step 410, the intersection curve resulting from step 408 does not intersect or lie within the coverage area of the originating base station for the first signal, step 414 is performed. In step 414, the first signal is identified as having been relayed by a repeater.

In one implementation, the coverage area of the originating base station is a parameter which is derived from information provided by an almanac available to the PDE.

Although the steps illustrated in FIG. 4 occur in a certain order, it should be appreciated that embodiments are possible in which this ordering is varied. For example, step 406 can occur in parallel with either or both steps 402 and 404.

Figure 7:
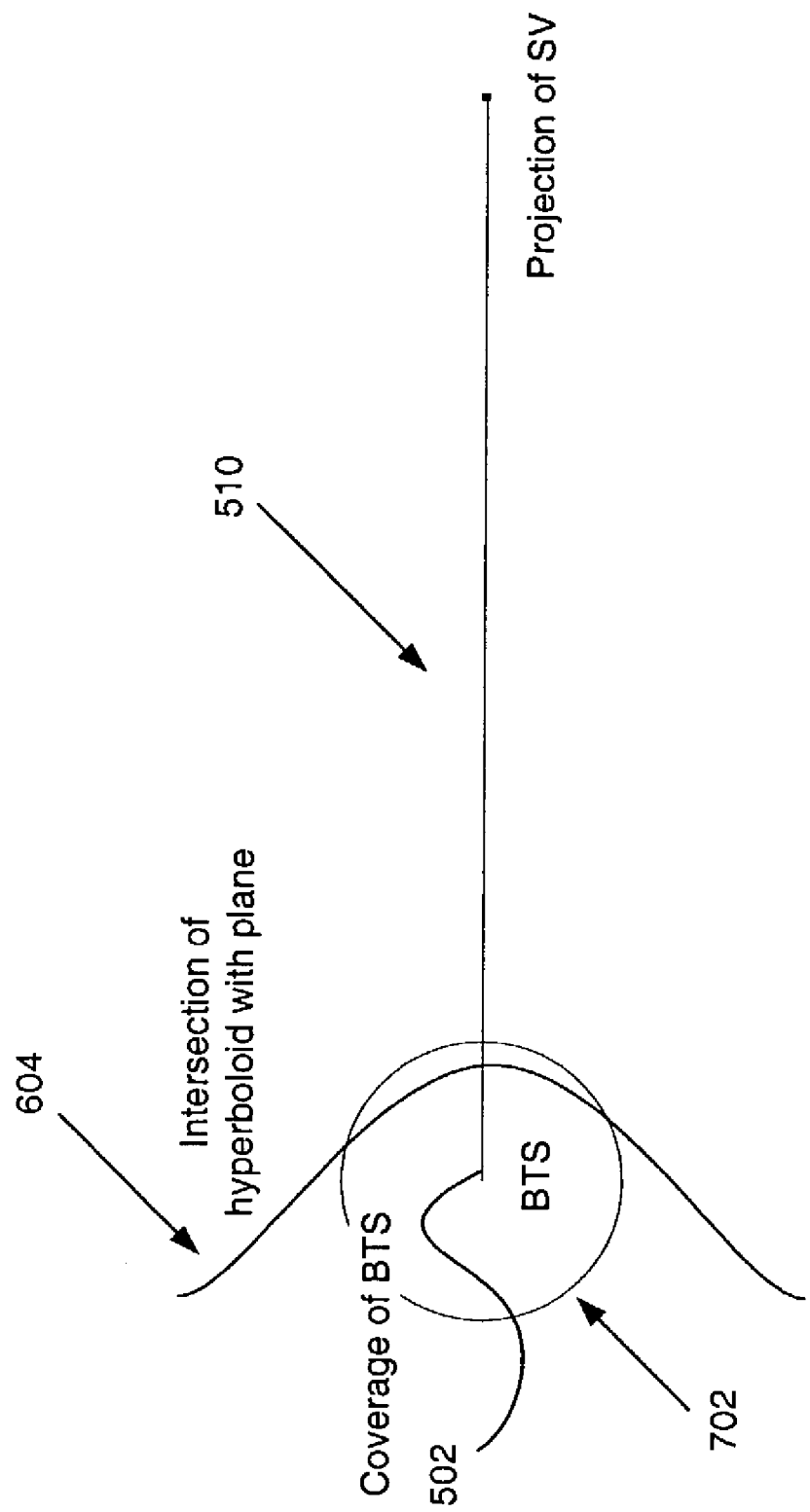
FIG. 7 is a diagram illustrating the intersection between an intersection curve and the coverage area of the originating base station for a signal.

FIG. 7 illustrates an intersection curve 604 which intersects or lies within the coverage area 702 of the originating base station for the first signal. Consequently, the first signal is identified as having been directly received at the subscriber station from the originating base station.

Figure 8:
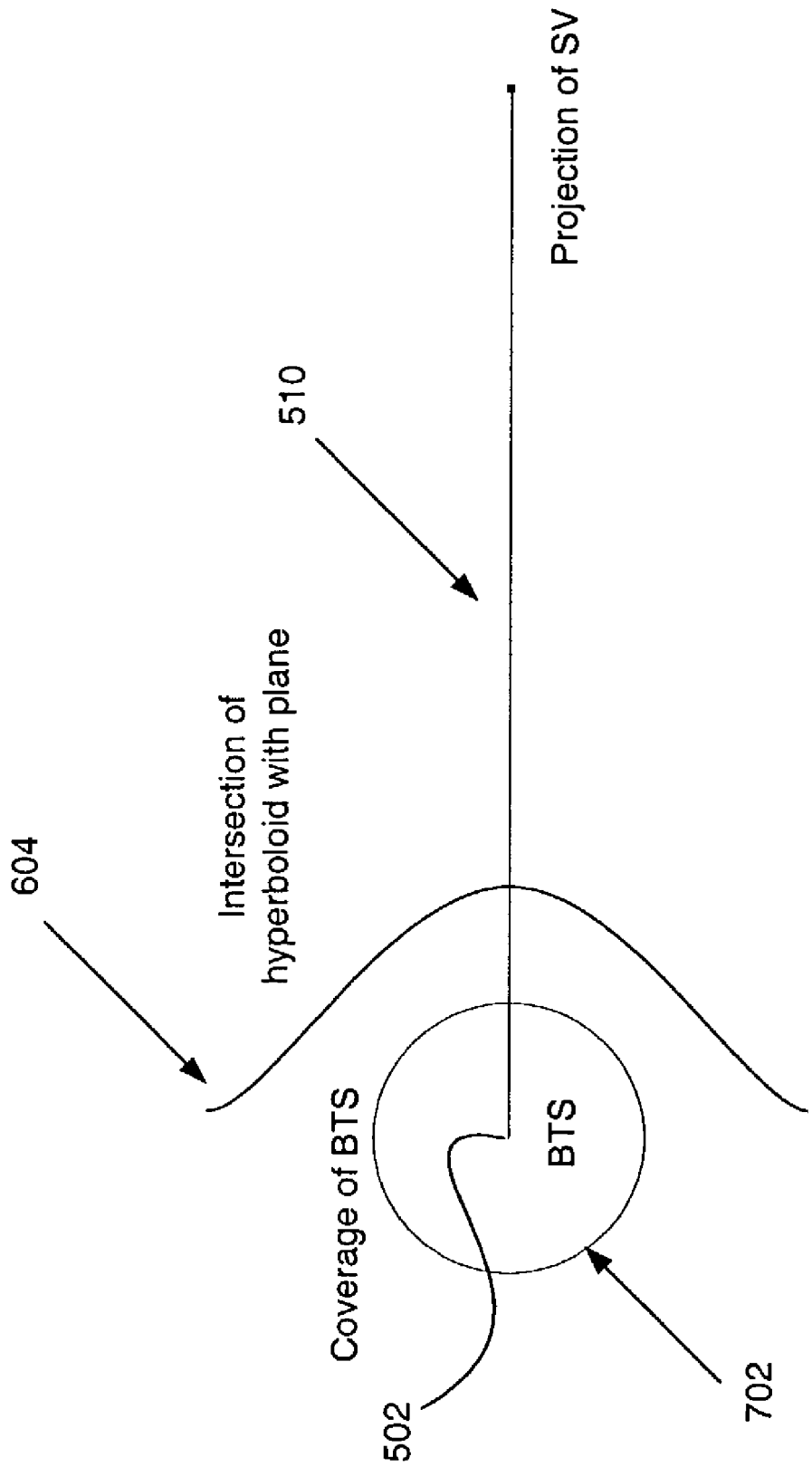
FIG. 8 is a diagram illustrating an intersection curve which does not intersect and lies outside the coverage area of an originating base station for a signal.

FIG. 8 illustrates an intersection curve 604 which lies outside and does not intersect the coverage area 702 of the originating base station for the first signal. Consequently, the first signal is identified as having been relayed by a repeater.

Figure 9:
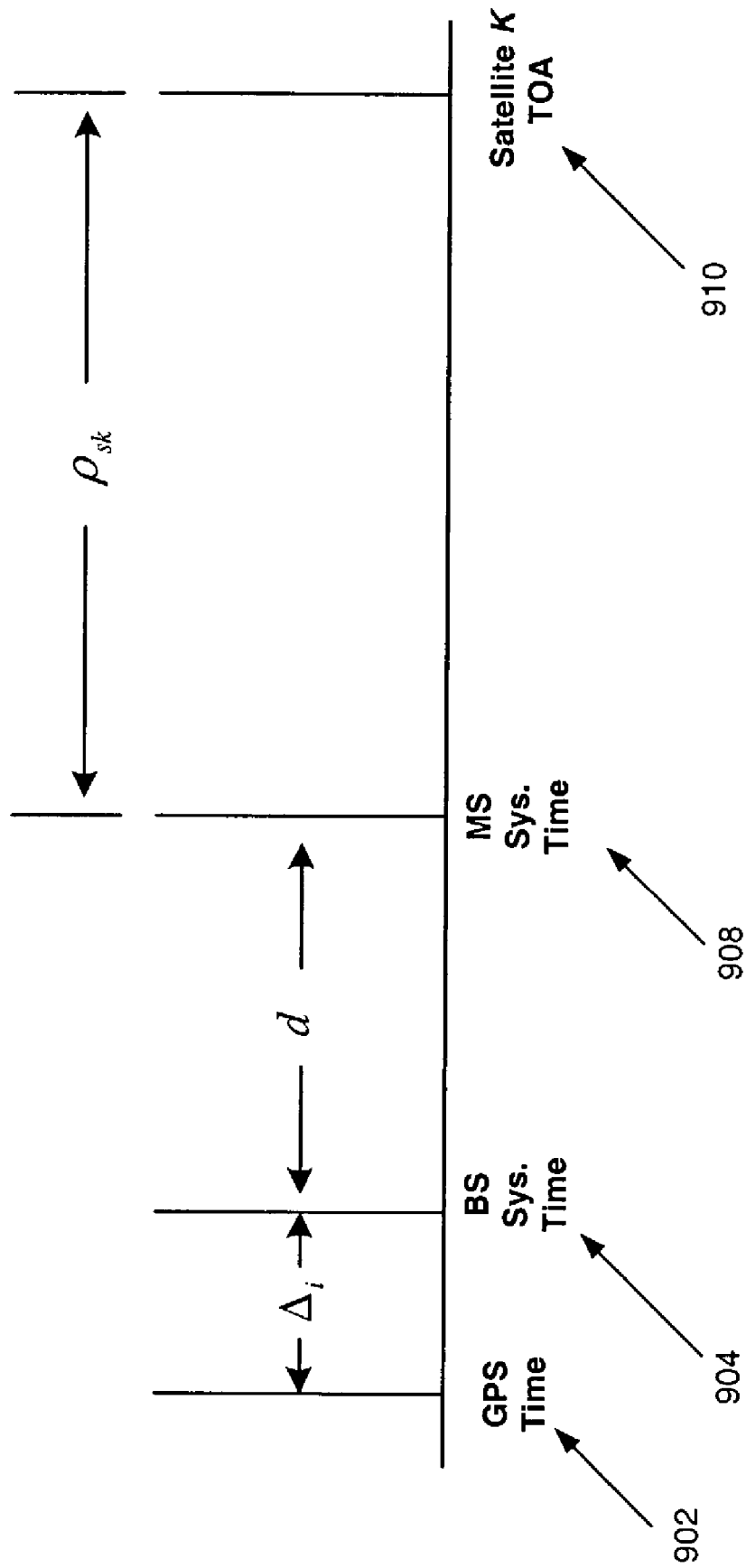
FIG. 9 is a timing diagram illustrating the time difference of arrival between a first signal originating from a base station and a second signal originating from a GPS satellite.

FIG. 9 illustrates an example of a timeline in the case in which the source of the second signal is a GPS satellite. Numeral 908 identifies the time of arrival of the first signal, and numeral 910 identifies the time of arrival of the second signal. The difference between these two values, $\rho_{sk}$, is the time difference of arrival value which is used to form the potential solution surface of step 404. In the case in which the potential solution surface is the two-sheet hyperboloid 500, the known location of the GPS satellite forms the second locus 504 of the two-sheet hyperboloid 500.

Time of arrival value 908 is determined by locating, using known techniques, the peak of the correlation function derived by correlating a composite signal, which comprises a composite of pilot signals received from those base stations visible to the subscriber station, with the PN code identifying the originating base station for the first signal. Time of arrival value 910 is determined by locating, using known techniques, the peak of the correlation function derived by correlating a composite signal, which comprises a composite of pilot signals received from those GPS satellites visible to the subscriber station, with the PN code identifying the GPS satellite originating the second signal.

Both time of arrival values 908, 910 are in terms of GPS system time 902. However, GPS system time 902 is not directly relevant here since both time of arrival values 908, 910 are in terms of GPS system time 902; hence, this value drops out of the calculation of $\rho_{sk}$.

The time of arrival 908 of the first signal is the sum of $\Delta_i$, the offset between GPS system time and system time at the originating base station for the first signal, and d, the one-way propagation delay between transmission from the originating base station and reception at the subscriber station. The value $\Delta_i$ is typically a known previously-determined calibration parameter, and the value d is either the line-of-sight delay between the originating base station and the subscriber station, or the delay resulting from propagation through a repeater. These values are not directly relevant here since they are not needed to compute $\rho_{sk}$.

Figure 10:
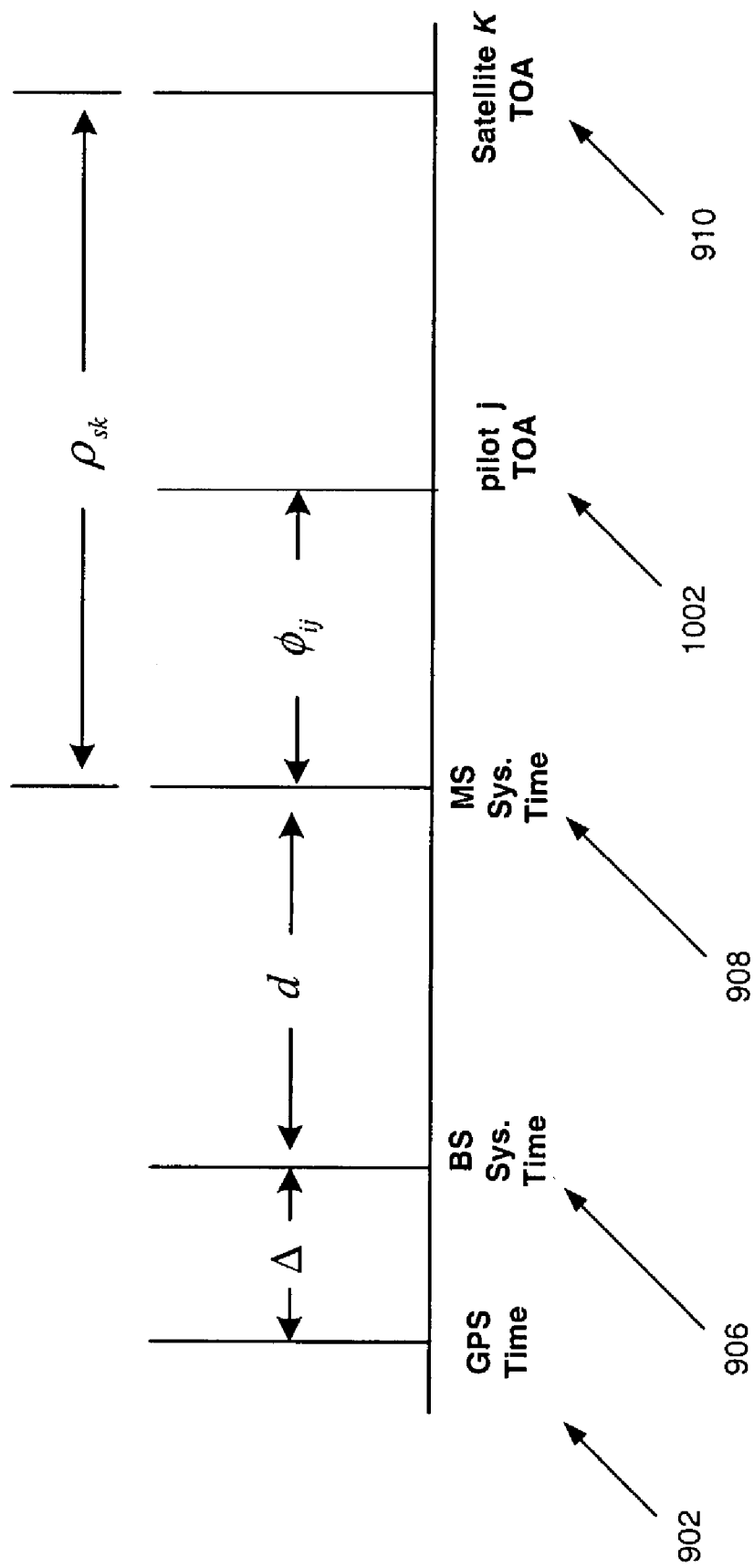
FIG. 10 is a timing diagram illustrating the time difference of arrival between first and second signals, each originating from a base station.

FIG. 10 is an example of a timeline in the case in which the source of the second signal is another base station. Numeral 908 again identifies the time of arrival at the subscriber station of the first signal, and numeral 1002 identifies the time of arrival at the subscriber station of the second signal originating from a second base station. The difference between these two values, $\phi_{ij}$, is the time difference of arrival value which is used to form the potential solution surface of step 404. In the case in which the potential solution surface is the two-sheet hyperboloid 500, the known location of the second base station forms the second locus 504 of the two-sheet hyperboloid 500.

Both time of arrival values 908 and 1002 are again in terms of GPS time 902, which again drops out of the calculation of $\phi_{ij}$. Also, the values $\Delta_i$ and d are similarly irrelevant since they are not needed to compute $\phi_{ij}$.

The time difference of arrival value $\rho_{sk}$ for a GPS satellite signal in relation to the first signal may also be computed to perform integrity monitoring. In integrity monitoring, the method of the invention is used to separately categorize the first signal either as having been received directly from its originating base station or as having been relayed by a repeater. One of the categorizations is performed using $\phi_{ij}$; the other is performed using $\rho_{sk}$. If the results match, they are deemed reliable and accepted. However, if the results do not match, they may be deemed unreliable, and additional measurements from other signal sources may be taken to reliably categorize the first signal.

Figure 11:
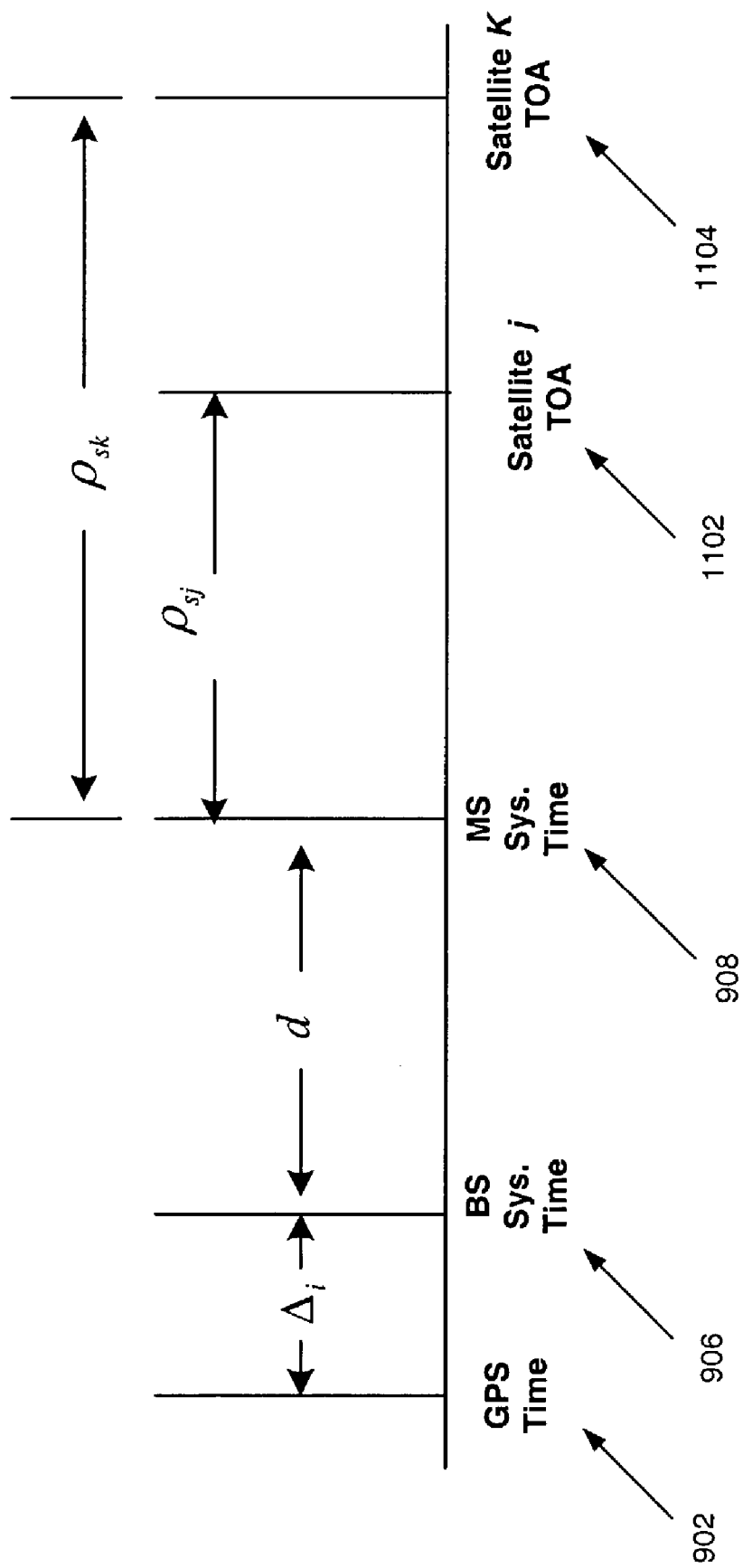
FIG. 11 is a timing diagram illustrating the application of multiple time difference of arrival values for integrity monitoring.

FIG. 11 is an example of a timeline in the case in which a received signal from more than one GPS satellite is received by a subscriber station and used for integrity monitoring. In this particular example, two GPS satellite signals are used, and the times of arrival of each are respectively identified with numerals 1102 and 1104. The time difference of arrival for each of the satellites, $\rho_{sk}$ and $\rho_{sj}$, is also determined. The value $\rho_{sk}$ is the time difference of arrival for one of the satellite signals in relation to the first signal, and the value $\rho_{sj}$ is the time difference of arrival for the other of the two satellite signals in relation to the first signal.

Using the method of the invention, one of the time difference of arrival values, either $\rho_{sk}$ or $\rho_{sj}$, is used to categorize the first signal. The other of the time difference of arrival values is used to separately categorize the first signal. If the results match, the results are deemed reliable and accepted; if they disagree, additional measurements might be taken to reliably categorize the first signal.

Although the example of FIG. 11 illustrates integrity monitoring using two GPS satellite signals, it should be appreciated that other examples are possible in which integrity monitoring is performed using two or more base station signals, combinations of base station and GPS satellite signals, and two or more GPS satellite signals.

Figure 12:
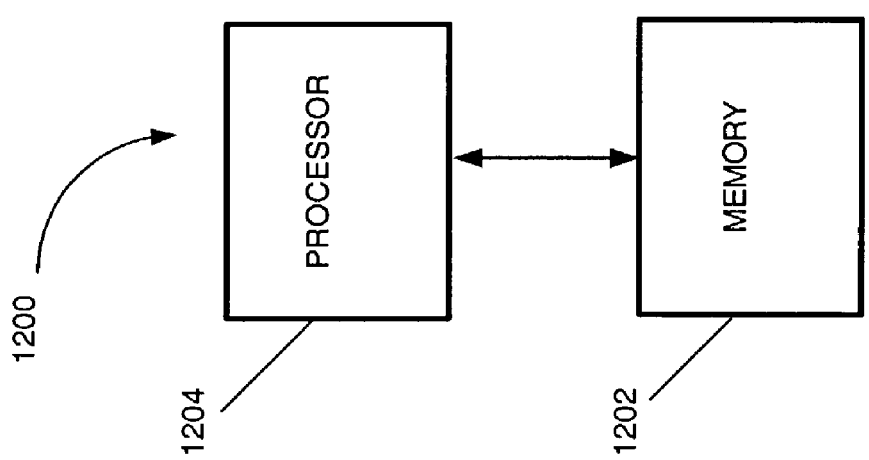
FIG. 12 is a block diagram of a system according to one embodiment of the invention for identifying whether a first signal received by a subscriber station was relayed by a repeater.

FIG. 12 illustrates an embodiment of a system 1200 according to the invention. As illustrated, in this embodiment, the system 1200 comprises a memory 1202 holding software instructions embodying the method of FIG. 4, or any of the embodiments, implementations, examples, or variants thereof which have been described or suggested. The system 1200 also comprises a processor 1204 configured to access and execute the software instructions held by the memory 1202. In performing the method of the invention, the processor 1204 accesses time of arrival and/or time difference of arrival values provided by a correlator (not shown) which in turn derives these values from signals provided to it by a receiver (not shown). The values may be provided to processor 1204 either directly or through memory 1202. It should be appreciated that embodiments of the system 1200 are possible which are implemented in hardware, software, or any combination of hardware and software.

Figure 13:
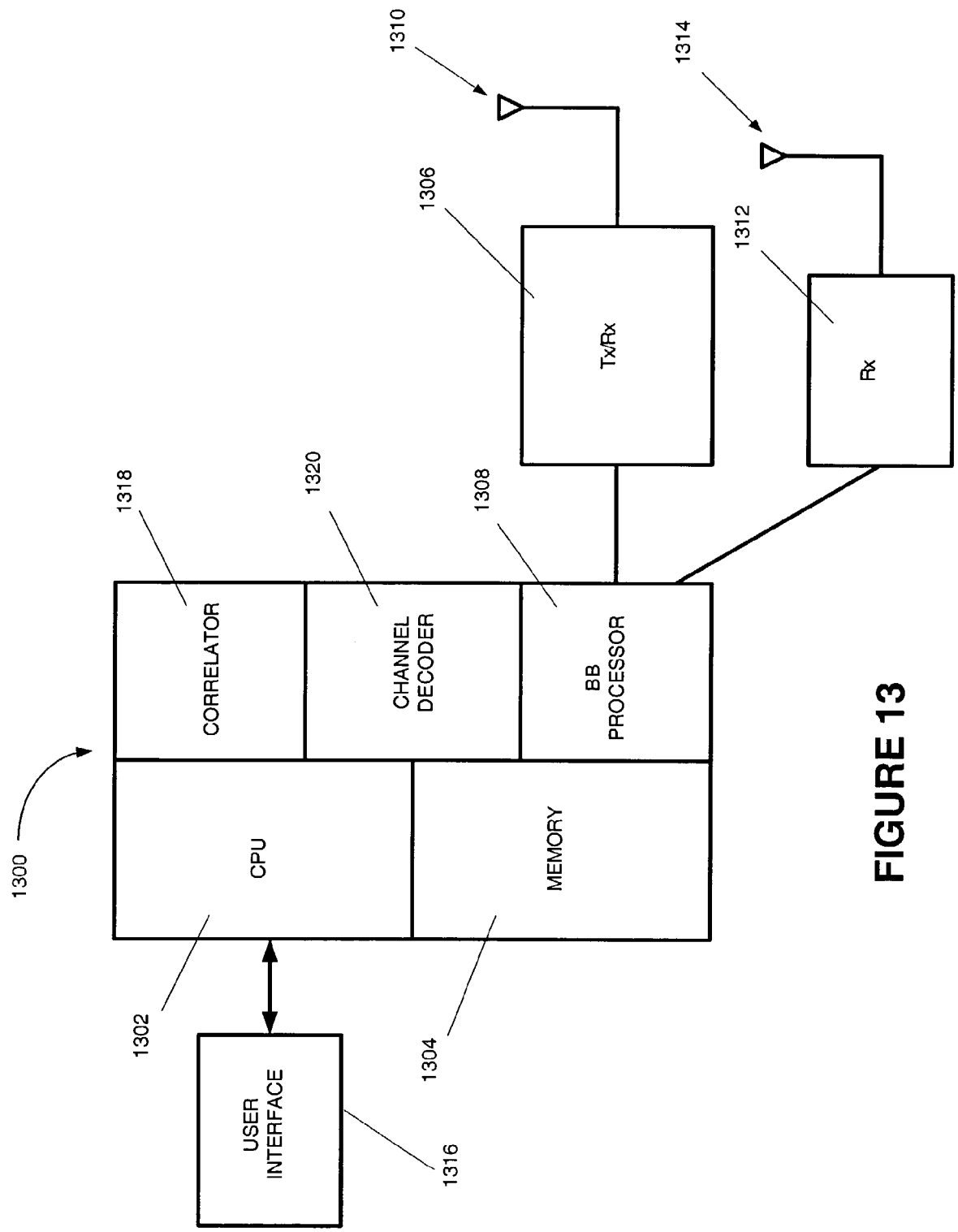
FIG. 13 is a block diagram of a subscriber station embodying or incorporating the system of FIG. 12.

FIG. 13 is a block diagram of an example of a subscriber station in a wireless communication system embodying or incorporating the system of FIG. 12. Other examples are possible so nothing in FIG. 13 should be taken as limiting.

Radio transceiver 1306 is configured to modulate baseband information, such as voice or data, onto an RF carrier, and demodulate a modulated RF carrier to obtain baseband information.

An antenna 1310 is configured to transmit a modulated RF carrier over a wireless communications link and receive a modulated RF carrier over a wireless communications link.

Baseband processor 1308 is configured to provide baseband information from CPU 1302 to transceiver 1306 for transmission over a wireless communications link. The CPU 1302 in turn obtains the baseband information from an input device within user interface 1316. Baseband processor 1308 is also configured to provide baseband information from transceiver 1306 to CPU 1302. CPU 1302 in turn provides the baseband information to an output device within user interface 1316.

User interface 1316 comprises a plurality of devices for inputting or outputting user information such as voice or data. The devices typically included within the user interface include a keyboard, a display screen, a microphone, and a speaker.

GPS receiver 1312 is configured to receive and demodulate a composite signal formed of pilot signals from GPS satellites visible to the subscriber station, and provide the demodulated information to correlator 1318. The composite signal is received over antenna 1314.

Similarly, radio transceiver 1306 is configured to receive and demodulate a composite signal formed of pilot signals transmitted by base stations visible to the subscriber station, and provide the demodulated information to correlator 1318. The composite signal is received over antenna 1310.

In this particular example, the GPS receiver 1312 and radio transceiver 1306 share the same filter chain, but it should be appreciated that examples are possible in which each is configured with a separate filter chain.

Correlator 1318 is configured to derive GPS correlation functions from the information provided to it by GPS receiver 1312, and base station correlation functions from the information provided to it by radio transceiver 1306.

Correlator 1318 is also configured to derive time of arrival and/or time difference of arrival measurements from the peaks of the correlation functions it derives. Alternatively, the CPU 1302 may derive this information from the correlation functions as provided to it by the correlator 1318.

This information may be used by the subscriber station to acquire wireless communications services and/or to determine its position or have its position determined by a PDE or other entity in the position determination system.

Channel decoder 1320 is configured to decode channel symbols provided to it by baseband processor 1308 into underlying source bits. In one example, where the channel symbols are convolutionally encoded symbols, the channel decoder is a Viterbi decoder. In a second example, where the channel symbols are serial or parallel concatenations of convolutional codes, the channel decoder 1320 is a turbo decoder.

Memory 1304 in configured to hold software instructions embodying the method of FIG. 4, or any of the embodiments, implementations, examples or variants thereof which have been described or suggested.

CPU 1302 is configured to access and execute these software instructions, and thereby identify whether or not signals originating from base stations have been relayed by repeaters.

While various embodiments of the invention have been described, it will be apparent to those of ordinary skill in the art that many more embodiments and implementations are possible that are within the scope of this invention.

What is claimed is:

1. A method of identifying whether a first signal received at a subscriber station has been relayed by a repeater comprising:
   measuring at the subscriber station a time difference of arrival between the first signal and a second signal;
   forming from the measured time difference of arrival a potential solution surface indicating possible positions of the subscriber station; and
   identifying whether or not the first signal was relayed by a repeater based on information derived from the potential solution surface.

2. The method of claim 1 wherein the first signal originates from a base station having a location and a coverage area, the second signal originates from a source having a location, and the identifying step comprises:
   forming a plane approximately tangential to the surface of the earth at the location of the originating base station for the first signal;
   intersecting the plane with the potential solution surface to form an intersection curve;
   identifying the first signal as having been directly received from the originating base station if the intersection curve intersects or lies within the coverage area of the originating base station; and
   identifying the first signal as having been relayed by a repeater if the curve does not intersect and lies outside the coverage area of the originating base station for the first signal.

3. The method of claim 1 wherein the source of the second signal is a GPS satellite.

4. The method of claim 3 wherein the location of the GPS satellite originating the second signal is obtained from an almanac.

5. The method of claim 1 wherein the source of the second signal is a base station.

6. The method of claim 5 wherein the location of the base station originating the second signal is obtained from an almanac.

7. The method of claim 1 wherein the potential solution surface is a hyperboloid.

8. The method of claim 7 wherein the hyperboloid is two-sheet hyperboloid having two loci, the first being the location of the originating base station for the first signal, and the second being the location of the source of the second signal.

9. The method of claim 1 wherein the location of the originating base station is obtained from an almanac.

10. The method of claim 1 wherein the first signal is a pilot signal.

11. The method of claim 1 wherein the second signal is a pilot signal.

12. A memory in which software instructions embodying the methods of claim 1 are stored.

13. A system comprising a processor and the memory of claim 12, wherein the processor is configured to access and execute the software instructions held by the memory.

14. A subscriber station embodying the system of claim 13.

15. A subscriber station incorporating or including the memory of claim 12.

16. In a synchronous position determination system, a method of identifying whether a first signal received at a subscriber station has been relayed by a repeater comprising:
    measuring at the subscriber station a time difference of arrival between the first signal and a second signal, the first signal originating from a base station having a location, and the second signal originating from a GPS satellite having a location;
    forming a hyperboloid from the measured time difference of arrival, the location of the originating base station for the first signal, and the location of the originating GPS satellite for the second signal; and
    identifying whether or not the first signal was relayed by a repeater based on information derived from the hyperboloid.

17. The method of claim 16 wherein the base station has a coverage area, and the identifying step comprises:
    forming a plane approximately tangential to the surface of the earth at the location of the originating base station for the first signal;
    intersecting the plane with the hyperboloid to form an intersection curve;
    identifying the first signal as having been directly received from the originating base station if the intersection curve intersects or lies within the coverage area of the originating base station; and
    identifying the first signal as having been relayed by a repeater if the curve does not intersect and lies outside the coverage area of the originating base station for the first signal.

18. The method of claim 17 wherein the hyperboloid is a two-sheet hyperboloid having first and second loci located respectively at the locations of the originating base station for the first signal, and the source of the second signal.

19. The method of claim 18 wherein the intersection curve is formed by intersecting the plane with the two-sheet hyperboloid.

20. A memory tangibly embodying a method of identifying whether a first signal received at a subscriber station has been relayed by a repeater comprising:
    measuring at the subscriber station a time difference of arrival between the first signal and a second signal;
    forming a potential solution surface from the measured time difference of arrival; and
    identifying whether or not the first signal was relayed by a repeater based on information derived from the potential solution surface.

21. The method of claim 20 wherein the first signal originates from a base station having a location and a coverage area, and the second signal originates from a source having a location, and the identifying step comprises:
    forming a plane approximately tangential to the surface of the earth at the location of the originating base station for the first signal;
    intersecting the plane with the potential solution surface to form an intersection curve;
    identifying the first signal as having been directly received from the originating base station if the intersection curve intersects or lies within the coverage area of the originating base station; and
    identifying the first signal as having been relayed by a repeater if the curve does not intersect and lies outside the coverage area of the originating base station for the first signal.

22. A system for identifying whether a first signal received at a subscriber station has been relayed by a repeater comprising:
    means for measuring at the subscriber station a time difference of arrival between the first signal and a second signal; and
    logic for (1) forming a potential solution surface from the measured time difference of arrival; and (2) identifying whether or not the first signal was relayed by a repeater based on information derived from the potential solution surface.

23. The system of claim 22 wherein the first signal originates from a base station having a location and a coverage area, the second signal originates from a source having a location, and the logic is further configured to (1) form a plane approximately tangential to the surface of the earth at the location of the originating base station for the first signal; (2) intersect the plane with the potential solution surface to form an intersection curve; (3) identify the first signal as having been directly received from the originating base station if the intersection curve intersects or lies within the coverage area of the originating base station; and (4) identify the first signal as having been relayed by a repeater if the curve does not intersect and lies outside the coverage area of the originating base station for the first signal.

24. A method of identifying whether a first signal received at a subscriber station has been relayed by a repeater comprising:
    a step for measuring at the subscriber station a time difference of arrival between the first signal and a second signal;
    a step for forming a potential solution surface from the measured time difference of arrival; and
    a step for identifying whether or not the first signal was relayed by a repeater based on information derived from the potential solution surface.

25. The method of claim 24 wherein the first signal originates from a base station having a location and a coverage area, and the second signal originates from a source having a location, and the identifying step comprises:
    a step for forming a plane approximately tangential to the surface of the earth at the location of the originating base station for the first signal;
    a step for intersecting the plane with the potential solution surface to form an intersection curve;
    a step for identifying the first signal as having been directly received from the originating base station if the intersection curve intersects or lies within the coverage area of the originating base station; and
    a step for identifying the first signal as having been relayed by a repeater if the curve does not intersect and lies outside the coverage area of the originating base station for the first signal.

* * * * *